United States Patent [19]

Takizawa et al.

[11] Patent Number: 5,783,221
[45] Date of Patent: Jul. 21, 1998

[54] CONTROL SYSTEM FOR AN INJECTION MOLDING MACHINE

[75] Inventors: Michiaki Takizawa; Yoshitomi Uchikawa; Osamu Ichikawa, all of Nagano, Japan

[73] Assignee: Nissei Plastic Industrial Co., Ltd., Nagano-Ken, Japan

[21] Appl. No.: 726,790

[22] Filed: Oct. 7, 1996

[30] Foreign Application Priority Data

Oct. 12, 1995 [JP] Japan .................. 7-290327

[51] Int. Cl.[6] .................................................. B29C 45/78
[52] U.S. Cl. ...................... 425/143; 264/40.6; 425/144
[58] Field of Search ............................. 425/143, 144; 264/40.6

[56] References Cited

U.S. PATENT DOCUMENTS

| | | | |
|---|---|---|---|
| 4,311,446 | 1/1982 | Hold et al. | 425/144 |
| 4,541,792 | 9/1985 | Zakic | 425/143 |
| 5,149,472 | 9/1992 | Suganuma | 425/144 |

FOREIGN PATENT DOCUMENTS 6-9832  3/1994  Japan.

Primary Examiner—Tim Heitbrink
Attorney, Agent, or Firm—Birch, Stewart, Kolasch & Birch, LLP

[57] ABSTRACT

A control system is applicable for an injection molding machine which has a temperature setting function and display function. The control system includes a temperature scale/unit setting function for selecting a temperature setting and a displaying mode which changes a data display between a Centigrade mode (where a temperature setting device and temperature on the display are performed in Centigrade) and a Fahrenheit mode. The control system also includes a display switching function for temporarily switching the display mode to a mode different from the current temperature setting mode as set by the temperature scale/unit setting function and a display mode restoring function for switching the temporarily switched display mode to the original display mode.

5 Claims, 3 Drawing Sheets

CONTROL SYSTEM FOR AN INJECTION MOLDING MACHINE

BACKGROUND OF THE INVENTION

1. Field of the Invention

The present invention relates to a control system for an injection molding machine having a temperature setting function and a temperature displaying function.

2. Description of the Related Art

In the prior art, an injection molding machine which can perform setting and displaying of molding conditions and so forth at different temperature scales/units has been known as disclosed in Japanese Examined Utility Model Publication (Kokoku) No. Heisei 6-9832, for example. Such type of injection molding machine is constructed to permit selection of one of a Centigrade mode (°C.), in which the Centigrade temperature scale/unit is used for expressing temperature, and Fahrenheit mode, in which the Fahrenheit temperature scale/unit is used for expressing temperature, upon setting and displaying temperature. Having the two temperature scales permits adaption of the injection molding machine to conditions in various countries employing one of the temperature scales/units. For instance, Japan employs the Centigrade temperature scale and the United States and so forth employs the Fahrenheit temperature scale.

On the other hand, in general, when the temperature scale/unit is varied, numerical values are often varied significantly. In case of the expression of the temperature, a value of the temperature is significantly different between Centigrade and Fahrenheit. For instance, 100° in Centigrade corresponds to 212° in Fahrenheit. Thus, the value becomes approximately double in case of the Fahrenheit expression in comparison with the Centigrade expression.

Accordingly, if the temperature mode is switched into the Centigrade mode in erroneous operation or verification of temperature by other person in the country where the Fahrenheit mode is employed, an operator may misunderstand that the displayed value of the temperature is in the Fahrenheit mode and thus make judgement that the temperature is lowered to be approximately half. Then, the operator may abruptly set the value to be approximately half in error. In such case, overheating of the machine occurs and results in failure of molding and equipments.

SUMMARY OF THE INVENTION

The present invention is to solve the problems existing in the prior art. Therefore, it is an object of the present invention to provide a control system for an injection molding machine which can certainly prevent erroneous setting of the temperature associated with switching of temperature scales/units in a display.

According to one aspect of the invention, a control system for an injection molding machine having a setting function and a display function of temperature, comprises:

a temperature scale/unit setting means for selectively setting a temperature expression scale/unit for temperature setting and displaying to one of a Centigrade mode and a Fahrenheit mode;

a display switching function portion for switching only the temperature scale/unit for displaying into the other of temperature expression unit;

a display switching release function portion for releasing switching by the display switching function portion to restore an original temperature expression scale/unit as set by the temperature scale/unit setting means; and a setting inhibiting function portion for inhibiting setting of temperature while the temperature expression scale/unit is switched to the other temperature expression scale/unit by the display switching function portion.

In the preferred construction, the display switching function portion is responsive to operation of a predetermined key to effect switching of the temperature expression scale/unit for displaying. Also, the display switching release function portion may be responsive to operation of an arbitrary key for releasing switching of the temperature expression scale/unit by the display switching function portion, or, in the alternative, the display switching release function portion may be responsive to expiration of a predetermined period after switching of the temperature expression scale/unit into the other temperature expression scale/unit for restoring an original temperature expression scale/unit as set by the temperature scale/unit setting means.

A display color may be varied while the other temperature expression scale/unit is displayed in response to operation of the display switching function portion.

With the construction set forth above, once the temperature expression scale/unit for setting and displaying the temperature is set by the temperature scale/unit setting means into either the Centigrade mode or the Fahrenheit mode, the temperature expression scale/unit for display may be temporarily switched into the other mode by the display switching function portion. While the temperature is displayed in the switched mode, setting of the temperature is inhibited by the setting inhibiting function portion so that erroneous setting of the temperature associated with temporarily switching of the temperature expression scale/unit can be certainly prevented. Also, the display switching release function portion may release switching by the display switching function portion to restore the original temperature expression scale/unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

Next, the present invention will be discussed hereinafter in detail in terms of the preferred embodiment with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to unnecessary obscure the present invention.

Firstly, a construction of the preferred embodiment of a control system 1 for an injection molding machine according to the present invention will be discussed with reference to FIG. 1.

Figure 1:
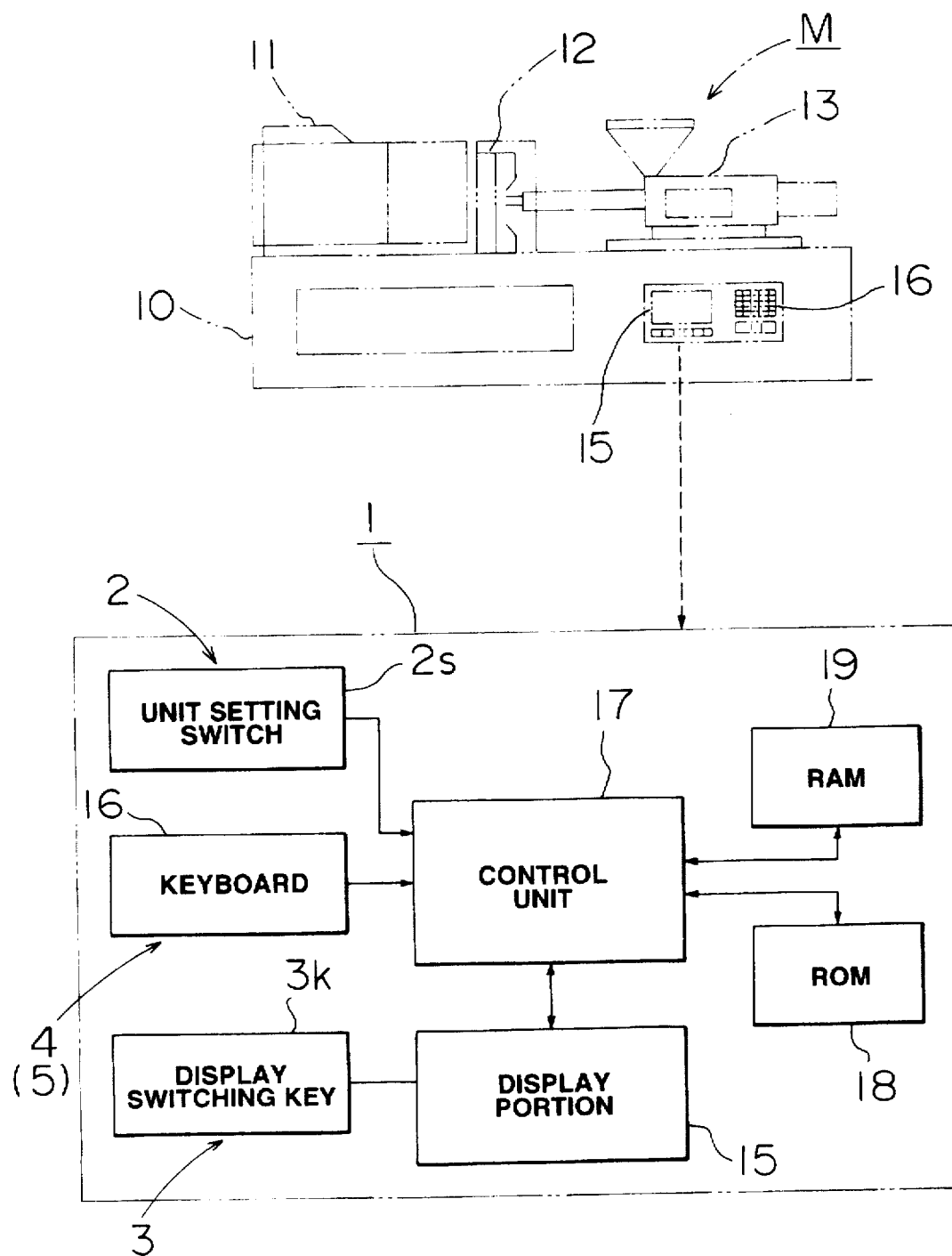
FIG. 1 is a block diagram showing major part of the preferred embodiment of a control system according to the present invention.
Figure 2:
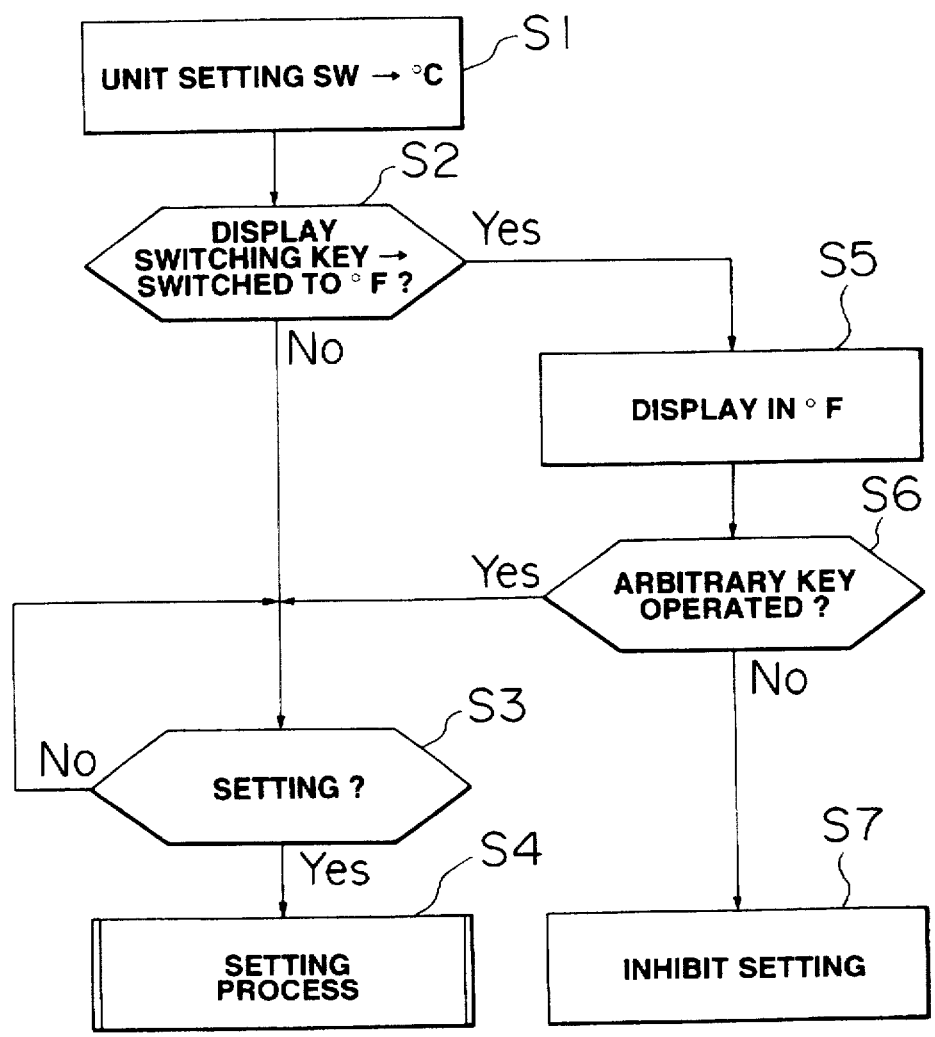
FIG. 2 is a flowchart for explaining functions of the control system.

FIG. 1 shows a major part of the control system 1. It should be noted that an external appearance of an entire injection molding machine M is illustrated in phantom line. The injection molding machine M has a base 10. A mold 12 is mounted on a clamping device 11 which is located on the upper surface of the front portion of the base 10, and an injection device 13 is mounted on the upper surface of the rear portion of the base 10 and movable toward and away from the mold 12. On the other hand, the base 10 houses a control system 1 having a computer function. The control system 1 includes a display portion 15 and a keyboard (operation panel) 16 arranged at a side surface of the base. Within the base 10, hardware including a control unit (including a CPU or so forth) 17, a ROM 18, a RAM 19 and so forth necessary for computer process are mounted.

On the other hand, the reference numeral 2s denotes a temperature scale/unit setting switch, which is connected to the control scale/unit 17 to form a temperature unit setting means 2. By means of the temperature scale/unit setting switch 2s, a unit for temperature setting and displaying can be set to either a Centigrade mode (°C.) or a Fahrenheit mode (°F.). Accordingly, by switching the temperature scale/unit setting switch 2s toward the Centigrade mode, for example, the temperature scale/unit of setting and displaying of the temperature can be unified in the Centigrade mode (°C.). Here, it is preferred that the temperature scale/unit setting switch 2s is arranged at a position other than the keyboard 16 and thus being not normally accessible.

Also, the reference numeral 3k denotes a display switching key for switching only the display to the other temperature scale/unit. Accordingly, when the temperature scale/unit setting switch 2s is in the Centigrade mode position, only the display of the temperature may be switched into the Fahrenheit mode by switching operation of the display switching key 3k. The display switching key 3k may be formed utilizing a touch panel 20 displayed on the display portion 15. With the display switching key 3k and the control unit 17 processing an switching information from the display switching key 3k, a display switching function portion 3 is formed.

On the other hand, the reference numeral 4 denotes a display switching release function portion. The display switching release function portion 4 has a function responsive to depression of arbitrary key 4k on the keyboard 16 and the touch panel 20 (see FIG. 5) to provide information thereof to the control unit 17, and thus to release switching of the temperature scale/unit by the display switching function portion 3 for restoring to an original temperature scale/unit. Therefore, the construction of such display switching release function portion 4 may be commonly used with a setting inhibiting function portion 5 which inhibits setting of the temperature while the temperature scale/unit on the display is switched by the display switching function portion 3 into the unit other than the unit set by the unit setting switch 2s.

Next, the function (operation) of the preferred embodiment of the control system 1 for the injection molding machine will be discussed hereinafter with reference to a flowchart in FIG. 2 and FIGS. 3 to 5.

Figure 3:
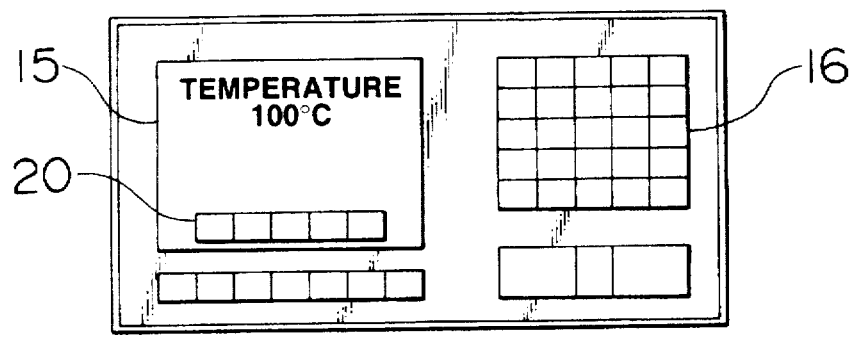
FIG. 3 is an explanatory illustration showing an operation method and display condition of the control system.

First, by the temperature scale/unit setting switch 2s, the temperature scale/unit mode is selected between the Centigrade mode and the Fahrenheit mode (step S1). Here, for the purpose of disclosure, the following disclosure will be given in the case where the Centigrade mode is selected through the temperature scale/unit setting switch 2s at step S1. By this, units of the temperature setting and displaying is unified into the Centigrade mode (°C.). Accordingly, as shown in FIG. 3, the temperature display in the Centigrade mode, such as "Temperature 100° C." on the display portion 15. Upon setting of the temperature for a molding temperature, a heating cylinder temperature and so forth, setting process in the Centigrade mode is performed (steps S3 and S4).

Figure 4:
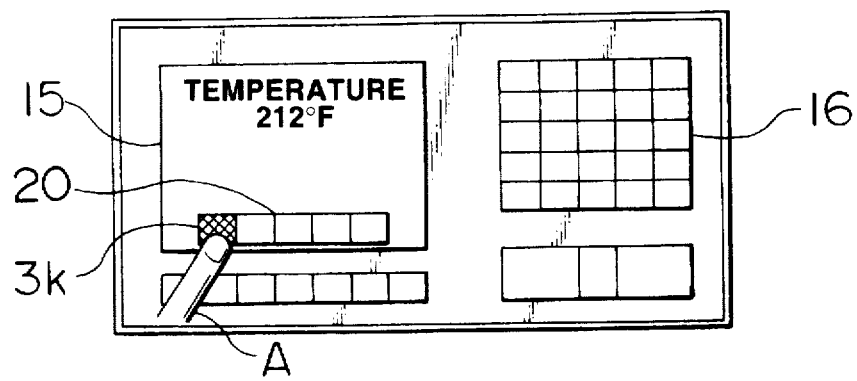
FIG. 4 is an explanatory illustration showing an operation method and display condition of the control system.

On the other hand, if it is desired to check the temperature in the Fahrenheit mode, by touching the display switching key 3k of the touch switch 20 displayed on the display portion 15 by a finger A, as shown in FIG. 4, the temperature display of the display portion 15 is switched into the display in the Fahrenheit mode, namely such as "Temperature 212° F." (steps S2 and S5). By this, the temperature in the Fahrenheit mode can be seen.

Figure 5:
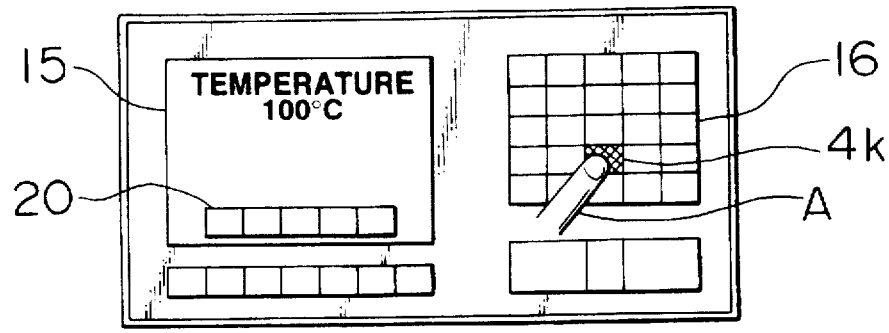
FIG. 5 is an explanatory illustration showing an operation method and display condition of the control system.

On the other hand, as shown in FIG. 5, by arbitrarily depressing any key 4k on the keyboard 16 and the touch panel 20, switching of display by the display switching function portion 3 is released for restoring display in the original temperature scale/unit. Therefore, even when the operator misunderstands the value "212" on the display, as the Centigrade mode expression, for example, to attempt to reset temperature, the display on the display portion 15 is instantly restored to the temperature display of "Temperature 100° C.". Thus, erroneous setting of the temperature can be successfully avoided. On the other hand, while the temperature display is switched into the Fahrenheit mode by the display switching key 3k, setting of the temperature is inhibited by the setting inhibiting function portion 5 established in common to the display switching release function portion 4 (step S7).

Such function is similar to the case where the temperature scale/unit is switched into the Fahrenheit mode by the temperature scale/unit setting switch 2s. In the foregoing explanation, the Centigrade mode is replaced with the Fahrenheit mode and the Fahrenheit mode is replaced with the Centigrade mode.

As set forth above, the control unit for the injection molding machine according to the present invention can successfully prevent erroneous setting of the temperature associating with switching of the temperature display scale. Therefore, failure of molding in overheating or harmful influence to the equipments can be prevented.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, the temperature scale/unit setting means 2 is exemplified in the case where temperature scale/unit is set by means of the temperature scale/unit setting switch 2s provided in the injection molding machine. However, the temperature scale/unit setting means 20 may encompass the case where a ROM set in one of the temperature scales/units is preliminarily installed upon shipping.

On the other hand, the display switching release function portion 4 may be constructed to return the original temperature scale/unit by releasing switching of the display by the display switching function portion 3 after expiration of a given period. In this case, the setting inhibit function portion 5 executes, in a software program, a process for inhibiting setting based on touching operation of the predetermined key 3k to release process for inhibiting setting after expiration of the given period. Furthermore, when the display is switched by the display switching function portion 3, it is possible to cause blinking or vary display color for temperature display of the switched unit.

Furthermore, while the foregoing embodiments have been discussed in terms of temperature as switched between the Centigrade mode and the Fahrenheit mode, the present invention is applicable not only for temperature expression but also for various other units, such as weight, volume and so forth. In addition, the control of numerical setting and displaying in a plurality of mutually distinct units may be applicable not only for injection molding technology but also various other technologies requiring numerical setting of parameters in variable units.

What is claimed is:

1. A control system for an injection molding machine having a setting function and a display function of temperature, comprising:

temperature scale setting means for selectively setting a temperature scale for temperature setting and displaying data in at least one of a first temperature scale and a second temperature scale, each temperature scale including at least one of a Centigrade mode and a Fahrenheit mode;

a display switching function portion for switching the displayed data from at least one of the first temperature scale to the second temperature scale and from the second temperature scale to the first temperature scale;

a display switching release function portion for releasing switching by said display switching function portion to restore the displayed data to at least one of the first and second temperature scales as set by said temperature scale setting means; and a setting inhibiting function portion for inhibiting setting of temperature while said display switching function portion is activated.

2. The control system as set forth in claim 1, wherein said display switching function portion is activated by a predetermined key to effect switching of the temperature scale for displaying the data.

3. The control system as set froth in claim 1, wherein said displaying switching release function portion is activated by an arbitrary key for releasing switching of the temperature scale by said display switching function portion.

4. The control system as set forth in clam 1, wherein said display switching release function portion is activated according to expiration of a predetermined period after switching of the temperature scale into at least one of the first and second temperature scales as set by said temperature unit setting means.

5. The control system as set forth in claim 1, wherein a display color is varied while data in at least one of the first and second temperature scales is displayed in response to operation of said display switching function portion.

* * * * *